United States Patent Office 3,441,538
Patented Apr. 29, 1969

3,441,538
BORON TRIFLUORIDE - HYDROGEN FLUORIDE CATALYZED SYNTHESIS OF POLY(AROMATIC KETONE) AND POLY(AROMATIC SULFONE) POLYMERS
Barnard M. Marks, Brandywine Hills, Wilmington, Del., assignors to E. I. du Pont de Nemours and Company, Wilmington, Del., a corporation of Delaware
No Drawing. Continuation-in-part of application Ser. No. 477,294, Aug. 4, 1965. This application July 17, 1967, Ser. No. 653,618
Int. Cl. C08g 43/00, 37/00, 15/00
U.S. Cl. 260—49                    18 Claims

ABSTRACT OF THE DISCLOSURE

Synthesis of polymers such as poly(aromatic ketones) and poly(aromatic sulfones) with a mixed boron fluoride-hydrogen fluoride catalyst.

Related application

This application is a continuation-in-part of U.S. application Serial No. 477,294, filed August 4, 1965, and a continuation-in-part of U.S. application Serial No. 566,775, filed July 21, 1966.

Statement of the invention

According to the present invention, a large number of useful polymers is prepared from certain starting materials, in a condensation reaction, wherein outstanding advantages are obtained using in the polymerization reaction, a mixed boron fluoride-hydrogen fluoride catalyst.

The polymers which can be prepared according to the process of this invention include those consisting essentially of one or more of the following structural units:

(1)

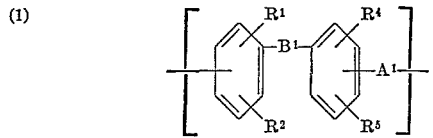

where $A^1$ is selected from the group consisting of

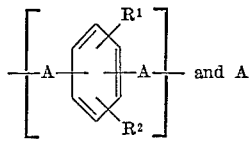  and A

A is selected from the group consisting of

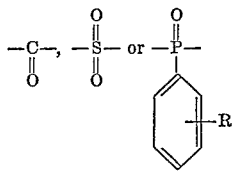

$R^1$, $R^2$, $R^4$ and $R^5$ can be the same or different and each is hydrogen; alkyl of 1 through 4 carbons; alkoxy of 1 through 4 carbons; halogen including chlorine, bromine and fluorine; hydroxy; phenyl substituted with 1 or 2 electronegative radicals or phenoxy substituted with 1 or 2 electronegative radicals wherein the electronegative radical is nitro, nitroso, cyano, fluoro or trifluoromethyl;

and R is hydrogen, nitro, nitroso, cyano, fluoro or trifluoromethyl; and $B^1$ is a covalent bond, —O—, —S—,

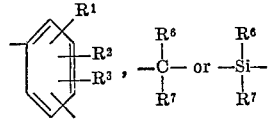

where $R^1$ and $R^2$ have the same meaning as above; and $R^3$ is nitro, nitroso, cyano, fluoro or trifluoromethyl; where $R^6$ and $R^7$ can be the same or different and each are hydrogen, alkyl or 1 through 4 carbons, trifluoromethyl or

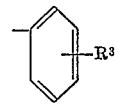

where $R^3$ has the same meaning as above;

(2)

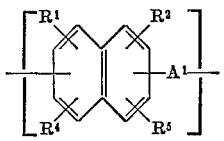

where $A^1$, $A^1$, $R^2$, $R^4$ and $R^5$ have the same meaning as above;

(3)

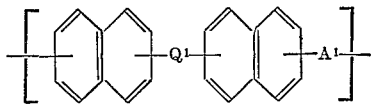

where $Q^1$ is a covalent bond, —O— or —S—; and $A^1$ has the same meaning as above; and (4)

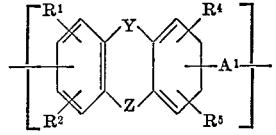

where $A^1$, $R^1$, $R^2$, $R^4$ and $R^5$ have the same meaning as above; and Y and Z can be the same or different and each is a covalent bond, —O—, —S—, or —CH$_2$—.

The polymers of Formuals 1 through 4 above are not by any means fully equivalent to each other. Indeed, a large number of them are heretofore unknown and have a particularly surprising combination of excellent properties. However, the process conditions of the present discovery are broadly applicable in the preparation of the indicated polymers to provide their enhanced properties.

An especially preferred class of polymers prepared in accordance with this invention have at least 80 percent of the repeating units of a structure selected from the class consisting of

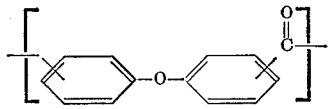

and

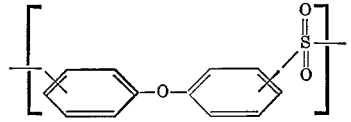

The remainder of the units in this preferred class of polymers are selected from the units hereinabove described.

In its broad aspect, the process of this invention is capable of producing polymers within the scope of the above Formulas 1 through 4 having exceptionally high molecular weight. For example, using the process of this invention, samples of polymer having an inherent viscosity as high as 6.5 have been prepared. At the same time, the polymers are characterized by low viscosity in the melt phase and are therefore melt extrudable.

Some polymers within the above described scope have outstanding thermal and oxidation stability, even at high temperatures over extended periods. Remarkable hydrolytic stability has also been observed. In one case, polymer samples in film form remained apparently unaffected even after retention for six months at reflux in 0.1 normal aqueous hydrochloric acid and in 0.1 normal aqueous sodium hydroxide.

The above described polymers are prepared, according to the present invention, in a condensation polymerization reaction involving one or more monomeric starting materials, wherein the reaction takes place in the presence of a boron fluoride-hydrogen fluoride catalyst.

Monomers useful in the process of this invention include those having the formulas (5) 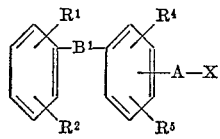

(6) 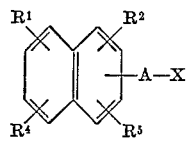

(7) 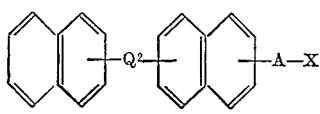

and (8) 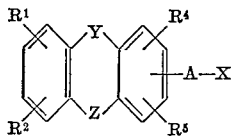

where X is halogen; $Q^2$ is a covalent bond, —O—, —S—, or A; and the other letters have the same meaning as above. One or more of these monomers polymerize in a self-condensation reaction to give the desired polymer. It will be understood that, when a plurality of such monomers is used, there can be used two or more from each of Formulas 5 through 8 or, additionally or alternatively, monomers from two or more of the different groups of Formulas 5 through 8. It will be seen that the compounds of Formulas 5 through 8 can be identified as acyl halides, sulfonyl halides or phenyl phosphoryl halides. Although X is preferably chlorine, other halogens are of course contemplated such as bromine and fluorine.

Illustrative of the compounds within the scope of Formula 5 above are the following:

p-phenoxybenzoyl chloride
p-phenoxybenzene sulfonyl chloride
p-phenoxyphenyl p-nitrosophenyl phosphoryl chloride
p-phenoxyphenyl phenyl phosphoryl chloride
p-phenylbenzoyl chloride
p-tolylbenzoyl chloride
p-phenoxyphenyl p-cyanophenyl phosphoryl chloride
m-phenylbenzoyl chloride
m-phenylbenzoyl bromide
m-phenylbenzoyl iodide
p-(phenylthio)benzoyl chloride
p-(phenylthio)benzene sulfonyl chloride
p-benzylbenzoyl chloride
p-benzylbenzene sulfonyl chloride
p-benzylphenyl p-nitrophenyl phosphoryl chloride
p-(phenylisopropyl)benzoyl chloride
p-(phenylisopropyl)benzene sulfonyl chloride
p-(di-trifluoromethyl phenyl)methylbenzoyl chloride
p-(di-trifluoromethyl phenyl)methylbenzene sulfonayl chloride
p-(dimethyl phenyl)silylbenzoyl chloride
m-(phenylthio)benzene sulfonyl chloride
p-(phenyl 4-trifluoromethylphenyl)methyl-benzoyl bromide
m-phenylbenzene sulfonyl chloride
p-phenylbenzene sulfonyl chloride
m-phenoxybenzoyl chloride
m-phenoxybenzene sulfonyl chloride
p-(4-hydroxyphenoxy)benzoyl chloride
p-(4-phenyl-3-nitrophenyl)benzoyl chloride
o-phenoxybenzoyl chloride
o-(phenylthio)benzoyl chloride
m-(phenylthio)benzoyl chloride
3-(2-methylphenyl)-4-chloro-2-methylbenzoyl chloride Illustrative of the compounds within the scope of Formula 6 above are the following:

alpha-naphthoyl chloride
beta-naphthoyl chloride
alpha-naphthoyl bromide
beta-naphthoyl bromide
alpha-naphthoyl fluoride
beta-naphthoyl fluoride
alpha-naphthoyl iodide
beta-naphthoyl iodide
alpha-napthalene sulfonyl chloride
alpha-naphthyl p-nitrophenyl phosphoryl chloride
2,8-dimethyl-alpha-naphthoyl chloride
2,6-ethoxy-alpha-naphthoyl chloride
5-(p-nitrophenyl)-alpha-naphthoyl chloride
6-hydroxy-alpha-naphthalene sulfonyl chloride Illustrative of the compounds within the scope of Formula 7 above are the following:

5-(apha-naphthoxy)-alpha-naphthoyl chloride
5-(alpha-naphthylthio)-alpah-naphthoyl chloride
5-(alpha-naphthoyl)-alpha-naphthoyl chloride
5-(beta-naphthalene sulfonyl)-beta-naphthalene sulfonyl chloride
5-(alpha-naphthyl)-alpha-naphthoyl chloride
6-(beta-naphthoxy)-beta-naphthoyl chloride Illustrative of the compounds within the scope of Formula 8 above are the following:

1-diphenylene carbonyl chloride
2-diphenylene carbonyl chloride
2-fluorene carbonyl chloride
2-dibenzofuran carbonyl chloride
2-thianthrene carbonyl chloride
2-phenoxathiin carbonyl chloride
2-phenodioxin carbonyl chloride
2-dibenzothiophene carbonyl chloride
1-diphenylene sulfonyl chloride
2-diphenylene sulfonyl chloride
2-fluorene sulfonyl chloride
2-dibenzofuran sulfonyl chloride
2-thianthrene sulfonyl chloride
2-phenoxathiin sulfonyl chloride
2-phenodioxin sulfonyl chloride
2-dibenzothiophene sulfonyl chloride
4,5-dimethyl-1-diphenylene carbonyl chloride Of these monomers, phenoxybenzoyl chloride and p-phenoxybenzene sulfonyl chloride are preferred.

As will readily be understood by persons skilled in this art, the polymers of Formulas 1 through 4 can also be prepared in the process of this invention in a co-condensation polymerization reaction of one or more appropriately selected electrophilic compounds with one or more appropriately selected aromatic compounds. The selections will of course be made to provide a polymer having a structure as described above.

It will be understood therefore that the electrophilic compounds useful in the process of this invention will have the formulas (9)  X—A—X

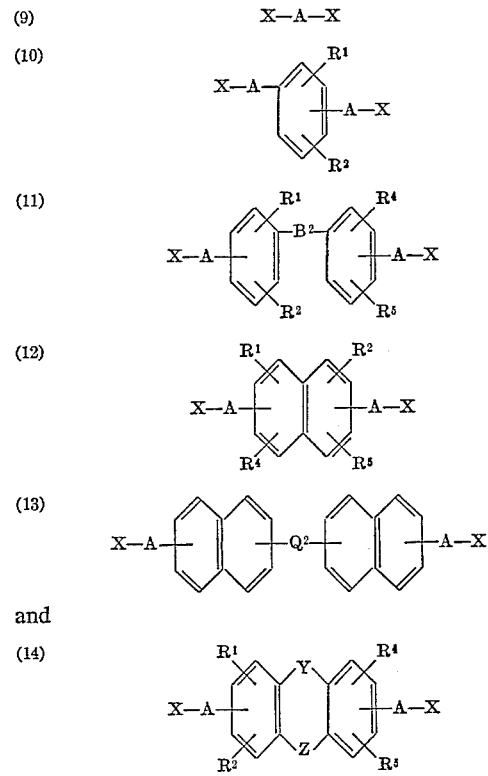

and (14)

where $B^2$ can be $B^1$ or A; and each of the other letters has the same meaning as above. The compounds of Formula 9 can be termed carbonyl dihalides, sulfonyl dihalides or phenyl phosphoryl dihalides, and the compounds of Formulas 10 through 14 can be termed di(carbonyl halides), di(sulfonyl halides) or di(phenyl phosphoryl halides). It will be understood that in the case of phosgene, the use of oxalyl chloride as the source of phosgene is fully contemplated within the scope of the present invention.

By way of illustration, representative compounds within the scope of Formula 9 above include the following:

phosgene
sulfuryl chloride
carbonyl difluoride
carbonyl dibromide
sulfuryl fluoride
sulfuryl bromide
p-nitrophenyl phosphoryl dichloride Illustrative of the compounds within the scope of Formula 10 above are the following:

terephthaloyl chloride
isophthaloyl chloride
benzene-1,4-di(sulfonyl chloride)
benzene-1,3-di(sulfonyl chloride)
benzene-1,4-di-(p-nitrophenyl phosphoryl chloride)
2-chlorobenzene-1,4-disulfonyl chloride
2,5-difluorobenzene-1,4-di(carbonyl fluoride)
2,5-dimethoxybenzene-1,4-di(carbonyl bromide)

Illustrative of the compounds within the scope of Formula 11 above are the following:

oxy-bis(4,4'-benzoyl chloride)
thio-bis(4,4'-benzoyl chloride)
diphenyl-4,4'-di(carbonyl chloride)
oxy-bis(4,4'-benzene sulfonyl chloride)
benzophenone-4,4'-di(carbonyl chloride)
carbonyl-bis(4,4'-benzoyl chloride)
oxy-bis(3,3'-benzoyl chloride)
thio-bis(3,3'-benzene sulfonyl chloride)
oxy-bis(3,3'-benzene sulfonyl chloride)
diphenyl-3,3'-di(carbonyl chloride)
carbonyl-bis(3,3'-benzoyl chloride)
carbonyl-bis(3,4'-benzoyl bromide)
sulfonyl-bis(4,4'-benzoyl chloride)
sulfonyl-bis(3,3'-benzoyl chloride)
sulfonyl-bis(3,4'-benzoyl chloride)
phenylphosphoryl-bis(4,4'-benzoyl chloride)
thio-bis(3,4'-benzoyl chloride)
diphenyl-3,4'-di(carbonyl chloride)
methylene-bis(4,4'-benzoyl chloride)
methylene-bis(4,4'-benzene sulfonyl chloride)
isopropylidene-bis(4,4'-benzoyl chloride)
bis(4,4'-benzoyl chloride)di-trifluoromethylmethane
bis(,4'-benzene sulfonyl chloride) dimethyl silane
oxy-bis[4,4'-(2-chlorobenzoyl chloride)]

Illustrative of the compounds within the scope of Formula 12 above are the following:

naphthalene-1,6-di(carbonyl chloride)
naphthalene-1,5-di(carbonyl chloride)
naphthalene-2,6-di(carbonyl chloride)
naphthalene-1,5-di(sulfonyl chloride)
2,5-dichloronaphthalene-1,6-di(carbonyl chloride)
3,4,7,8-tetramethylnaphthalene-2,6-di(carbonyl chloride)

Illustrative of the compounds within the scope of Formula 13 above are the following:

oxy-bis[7,7'-naphthalene-2,2'-di(carbonyl chloride
thio-bis[8,8'-naphthalene-1,1'-di(carbonyl chloride)]
7,7'-binaphthyl-2,2'-di(carbonyl chloride)
carbonyl-bis[7,7'-naphthalene-2,2'-di(carbonyl chloride)]
sulfonyl-bis[6,6'-naphthalene-2,2'-di(carbonyl chloride)]

Illustrative of the compounds within the scope of Formula 14 above are the following:

dibenzofuran-2,7-di(carbonyl chloride)
dibenzothiophene-1,8-di(sulfonyl chloride)
fluorene-2,7-di(carbonyl chloride)
thianthrene-1,8-di(sulfonyl chloride)

Copolymerizable with one or more of the monomers of Formulas 9 through 14 is one or more nucleophiles having the following formulas

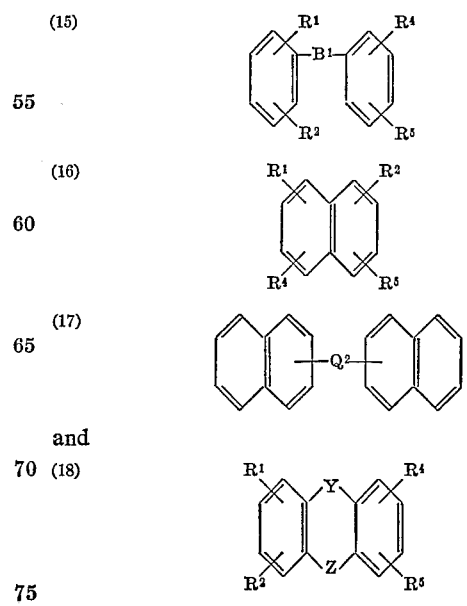

and (18)

wherein each of the letters has the same meaning as above.

Illustrative of the compounds within the scope of Formula 15 above are the following:

biphenyl
diphenyl ether
diphenyl sulfide
diphenyl methane
2,2-diphenylpropane
diphenyl di-triffuoromethyl methane
diphenyl dimethyl silane
1,4-diphenyl-2-nitrobenzene
di-p-tolyl ether
di-p-tolyl sulfide
di(2,5-dimethylphenyl) ether
p-benzylphenol
p-phenoxyphenol
p-phenylphenol Illustrative of the compounds within the scope of Formula 16 above are the following:

naphthalene
1,5-dimethylnaphthalene
2,6-dimethylnaphthalene
2-(p-nitrophenoxy)naphthalene
2,6-dimethoxynaphthalene
alpha-naphthol
beta-naphthol
1,5-dihydroxynaphthalene Illustrative of the compounds within the scope of Formula 17 above are the following:

1,1'-binaphthyl
1,2'-binaphthyl
2,2'-binaphthyl
1,1'-dinaphthyl ether
1,2'-dinaphthyl ether
2,2'-dinaphthyl ether
1,1'-dinaphthyl sulfide
1,2'-dinaphthyl sulfide
2,2'-dinaphthyl sulfide
1,1'-dinaphthyl ketone
2,2'-dinaphthyl sulfone Illustrative of the compounds within the scope of Formula 18 above are the following:

dibenzofuran
thianthrene
phenoxathiin
phenodioxin
dibenzothiophene
diphenylene
fluorene Thus, it will be seen that in the process of the present invention a monomer having the structure of Formula 5 can be homopolymerized to produce a polymer having the recurring unit structure of Formula 1; a monomer of Formula 6 can be homopolymerized to produce a polymer having the recurring unit structure of Formula 2; a monomer of Formula 7 can be homopolymerized to produce a polymer having the recurring unit structure of Formula 3; a monomer of Formula 8 can be homopolymerized to produce a polymer having the recurring unit structure of Formula 4.

It will also be seen that in the process of this invention, for example, that a monomer of Formula 5 can be copolymerized with a monomer of Formula 6 to produce a polymer having randomly recurring unit stuctures of both Formulas 1 and 2. By way of further example, one monomer of Formula 5 can be copolymerized with a different monomer of Formula 5 to produce a polymer having randomly recurring unit structures of the corresponding units of Formula 1. In this manner, there can be built up a large variety of substantially linear polymers having, as mentioned above, one or a plurality of randomly recurring units of the structures of one or more each of one or more of those of Formulas 1 through 5.

As mentioned above, the present invention resides essentially in the polymerization process involving one or more monomeric starting materials as indicated above, wherein the reaction takes place in the catalytic presence of boron fluoride and hydrogen fluoride.

The amount of catalyst used in the process of this invention can vary over a fairly wide range. Preferably, of course, the amount of catalyst will be the minimum amount found sufficient to catalyze the reaction and this can readily be determined for any given reaction by a few simple tests without undue experimentation. Amounts in excess of such amount can be used but may slow down the reaction some from optimum since excess catalyst dilutes the monomers.

The amount of catalyst will ordinarily be that which provides at least a molar equivalent, preferably an excess, and most preferably at least 2 or 3 moles of boron fluoride per A group (carbonyl, sulfonyl and/or phosphoryl group) in the monomeric reactants used. Preferably, less than 15 or 20 moles of boron fluoride per A group will be used.

The amount of hydrogen fluoride will be that which provides in excess of a molar equivalent of HF based on the amount of boron fluoride used. Preferably, from about 2 to about 10 moles of hydrogen fluoride will be used for each mole of boron fluoride.

The polymerization reactions according to the present invention will proceed within a fairly broad temperature range, ranging from as low as only a few degrees above the freezing temperatures of the reactants to as high as 100° or 150° C. For the most part, temperatures of about 100° C. or less will be satisfactory and even desirable since in some instances, in the polymerization involved there will be a tendency for the product to be insoluble and resulting handling difficulties and related process problems are generally minimized when the temeprature is below about 100° C.

Since it will sometimes be convenient to initiate the reaction at very cold temperatures, initial temperatures as low as −70° C. or thereabouts can be employed. Then the temperature is permitted to increase by the exothermic reaction or by external heating to a somewhat higher level. In general, temperatures between about −40° C. and about 60° C. are suitable. The particular temperature used, as well as the initial, and final temperatures, and the way the temperature increase if there is a variation during the reaction, will of course, depend on the particular monomers used, catalytic ratios, whether or not the process is a batch or continuous one, the results desired, etc., as will be readily understood by persons skilled in the art in accordance with the teachings herein.

The duration of the reaction will of course, be that sufficient to polymerize the reactant or reactants.

A particular advantage of this invention is that it provides a process for preparation of very high molecular weight polymers which are completely free of insoluble cross-linked materials.

Although the process of this invention is particularly advantageous in providing the indicated polymers of very high molecular weights, low molecular weight polymers can, if desired, be produced and therefore it is appropriate to say that the duration of the reaction will ordinarily be sufficient to provide a polymer having an inherent viscosity of at least about 0.1 as measured on a 0.5 percent by weight solution in concentrated (i.e., 98 percent) sulfuric acid at 30° C. Preferably, polymers having inherent viscosities of at least 0.5 will be obtained and, as mentioned above, polymers having inherent viscosities as high as 7 or 8 are readily obtainable under the conditions of this invention.

Useful polymers can be produced by the above process in reaction times as low as 15 or 20 minutes and as high as 10 or 20 hours or more. Even a minute or less is contemplated under some circumstances such as continuous operations. very satisfactory polymers of high molecular weight are readily obtainable in a reaction period of about 4 or 5 hours. The precise duration of the reaction period will of course, depend on the temperature of the reaction, the amount of catalyst present, whether or not a single temperature is maintained throughout the reaction or whether the temperature is increased as the reaction proceeds, and the like.

The process of this invention can conveniently be carried out at autogenous pressure, but pressures in excess thereof are not considered detrimental.

Although the process of the present invention proceeds satisfactorily under anhydrous conditions, the presence of a small amount of water may not be overly objectionable and under some circumstances may even enhance the catalytic effect of the mixture of boron fluoride and hydrogen fluoride. Ordinarily, no advantages are obtained using amounts of water in excess of about 1 percent by weight based on the total weight of the catalyst mixture used.

The polymer resulting from the process of this invention can be isolated, recovered and, if desired, purified according to conventional techniques. For example, the resulting mass can be dissolved in a suitable solvent, filtered to remove undissolved catalysts and impurities, and precipitated in a suitable non-solvent. Thus, by way of illustration, the copolymer of diphenyl ether with terephthaloyl chloride is dissolved in dichlorotetrafluoroacetone hydrate, followed by filtration and precipitation in methanol, to yield a snow-white product of excellent purity.

In an exemplary procedure for carrying out the process of this invention, an autoclave is used as the reaction vessel for a batch operation. The monomer or monomers are first charged to the autoclave and reduced to quite low temperatures, say about −75° C. Each of the two essential catalyst materials are introduced into the vessel as gases or liquids in separate metered streams, maintaining the low temperature to avoid premature reaction. The temperature is then raised to, say −20° C. and held for two hours, then to room temperature and held for four hours, with the contents of the vessel being mixed by shaking during the reaction.

The polymers resulting from the process of this invention are useful in a variety of applications. At low viscosities, such as on the order of 0.1–0.3, these polymers can be applied as surface coatings onto shaped articles including polymeric and non-polymeric articles. Film coatings are particularly of interest. They are likewise useful in adhesive compositions. At viscosities above about 0.3, the polymers can be used in the form of shaped articles which can be formed from the melt phase by extrusion or other convenient means Such shaped articles include films, filaments and the like.

Films of relatively high viscosity polymers made possible by this invention are characterized by low viscosity in the melt phase. Certain of them are markedly superior in one or more properties such as thermal stability, hydrolytic stability, toughness, flex life, oxidation resistance, heat sealability, tensile strength, elongation, etc.

Those polymers having units of Formulas 1 through 4 above wherein A is predominantly carbonyl and/or sulfonyl are generally less costly than the corresponding ones where A is predominantly the phenylphosphoryl gruop and for this reason the former types are advantageous compared with the latter. Those polymers having oxygen as a link in the polymer chain are advantageous in providing films of enhanced flexibility.

Certain of the polymers of Formula 1 above are characterized by an outstanding combination of useful properties, including excellent thermal stability and hydrolytic stability. Their flexibility and lack of flammability, even those without chlorine or phosphorus atoms present, make them particularly valuable. Within this group, the meta-oriented or meta-linked polymers are outstanding for their lower melting characteristics.

An important novel group of polymers including many that are novel are those having the units of Formulas 2 and 3 shown above. These polymers, in addition to excellent thermal and hydrolytic stabilities, have a superior stiffness and toughness which renders them of advantage for special applications. Such polymers derived from naphthalene of course, also have a desired cost advantage.

Particularly excellent films can be made using polymers described above by orientation such as by stretching in one or both directions to give films of a surprising combination of useful properties. Depending of course on such factors as the particular polymer, the starting film thickness, the stretching temperature, etc., as will be readily understood, films can be oriented in one or both directions by stretching as much as 5 or 6 or even 10 times or more its original dimension, at a stretching temperature, for example, in the range of about 200° to 300° C. Dimensional stability of the oriented film can be improved by a heat setting step.

In one test by way of illustration, a 35 mil thick film was cast from the polymer prepared by the boron trifluoridehydrogen fluoride catalyzed polycondensation of p-phenoxybenzoyl chloride. The unoriented film had a tensile strength of 13,100 pounds per square inch, a modulus of 440,000 pounds per square inch and an elongation of 25.3 percent. Orientation by stretching at 212° C. in only one direction 2 times its original dimension yielded a film having a tensile strength of 31,400 pounds per square inch, a modulus of 803,000 pounds per square inch and an elongation of 21.3 percent. Orientation by stretching at 212° C. in both directions 2 times its original dimensions yielded a film having a tensile strength of 25,800 pounds per square inch, a modulus of 599,000 pounds per square inch and an elongation of 81.7 percent.

This invention will be more fully understood by reference to the following illustrative examples in which parts and percentages are by weight unless otherwise indicated.

Example I

Twelve grams of p-phenoxybenzoyl chloride, purified by fractionation (B.P. 92–94°/0.05 mm.), was charged to a 100 milliliter stainless steel shaker tube which had been flushed with nitrogen. After the tube was closed and cooled to −78° C., 10 grams of anhydrous hydrogen fluoride was distilled into the tube and 25 grams of boron trifluoride was added under pressure. The reaction tube was warmed to −20° C. and kept between −20° and −5° C. with mechanical shaking for two hours, then heated at 50° C. for 4.5 hours. The polymer product was discharged from the tube by inverting it and allowing the gas pressure to blow the polymer out into methanol. The yellow polymer was cut up in an "Osterizer" under methanol and washed thoroughly with methanol. Thus, 9.8 grams (97 percent conversion) of polymer was obtained. The inherent viscosity of the product in concentrated sulfuric acid at 30° C. was 2.76. The polymer was purified by dissolving in dichlorotetrafluoroacetone monohydrate, filtering the solution and represcipitating in methanol as a white powder. Stiff, tough, opaque, brown, compression molded films were obtained at 400° C.

The crystalline melting point (tm.) of a sample of the polymer having an inherent viscosity of 1.33 and prepared by the same procedure described above was 361° C. as determined by differential thermal analysis, while the glass transition temperature (tg.) was 163°. The polymer begins to decompose at 440° C. as shown by thermogravimetric analysis in air and is completely decomposed at 630° C. At 412° C. in air, a sample of the polymer lost 2 percent of its weight after one hour, but lost 76 percent after seven hours.

Both compression molded film and powder samples of the polymer were shown to be crystalline by X-ray analysis with the film having a higher level of crystallinity than the powder.

Films of polymer with inherent viscosity of 1.18 prepared as above had a tensile strength of 14,400 pounds per square inch with a 7.2 percent ultimate elongation at room temperature. The flexural modulus in pounds per square inch at various temperatures were 761,000 at 23° C.; 672,000 at 100° C.; 200,000 at 150° C.; 66,900 at 170° C.; 63,900 at 200° C.; 48,100 at 250° C.; and 36,700 at 300° C.

The melt viscosity of a sample of the polymer with inherent viscosity of 1.02 prepared as above was $4.5 \times 10^4$ poises at 380° C.

*Analysis.*—Calcd. for $C_{13}H_8O_2$: C, 79.58; H, 4.11. Found: C, 79.15; H, 4.29

Infrared analysis confirmed the structure by showing absorption bands at microns 3.3(W), 6.1(S), 6.3(S), 6.7(M), 8.1(VS), 8.6(S), 9.0(M), 9.8(M), 10.4(W), 10.5(W), 10.7(S), 11.5(S), 11.8(S) and 13.1(S).

Example II

Into a 100 cc. stainless steel high pressure shaker tube were charged 10 grams of p-phenoxybenzene sulfonyl chloride, 8 grams of anhydrous hydrogen fluoride, and 20 grams of boron trifluoride at −78° C. The tube was warmed to −10° C., kept at that temperature for 2 hours and then heated to 50° C. for 4½ hours. The contents of the bomb were discharged into methanol and the precipitated polymer was washed with methanol and then powdered by stirring in a Waring Blendor with solid carbon dioxide. The polymer softened at 280° C. It was only partially soluble in concentrated $H_2SO_4$ and hence, a meaningful inherent viscosity value could not be obtained. A clear, tough, stiff, slightly yellow film was compression molded at 330° C. with a platen pressure of 20,000 pounds for 3½ minutes. The polymer analyzed for 13.9 and 13.4 percent sulfur in two determinations. The theoretical value for a polymer of structure

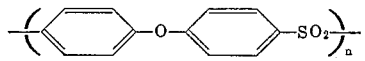

where n is very large is 13.8 percent.

Example III

A 300 cc. platinum-lined, high pressure shaker tube was charged at −78° C. with 30 grams of p-phenylbenzoyl chloride, 25 grams of anhydrous hydrogen fluoride and 62.5 grams of boron trifluoride. The reaction mixture was warmed to −10° C., kept at that temperature for 2 hours and then heated to 68–69° C. for 4½ hours. The solid polymer was ground up in methanol, extracted with hot acetone, and hot dioxane and then allowed to stand overnight in propylene oxide to remove residual hydrogen fluoride. After drying in a vacuum oven at 160° C. the product weighed 20.5 grams. An additional 3.9 grams of polymer was obtained as a stiff, tough, transparent film from the shaker tube. The polymer was soluble in sulfuric acid and had an inherent viscosity in this solvent of 1.7. Infrared analysis indicated it to have the desired 4-biphenylene ketone structure, that is,

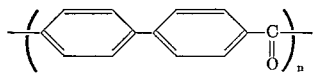

The polymer could be compression molded at 530° C. and 4,000 pounds per square inch for 1½ minutes to a hard, rigid, 100 mil chip. X-ray powder patterns showed it to have substantial crystallinity. Infrared analysis confirmed the structure by showing absorption bands at microns 3.4(S), 6.1(S), 6.3(S), 6.9(S), 7.3(S), 7.9(S), 8.5(M), 8.7(W), 9.2(W), 9.5(W), 10.0(M), and 10.8(S).

Example IV

A 300 milliliter platinum-lined, high pressure shaker tube was charged at −78° C. with 12½ grams of p-phenylbenzoyl chloride, 1.25 grams of o-phenylbenzoyl chloride, 12 grams of anhydrous hydrogen fluoride, and 30 grams of boron trifluoride. The reaction mixture was warmed to −10°, kept at that temperature for 2 hours and then heated at 73° C. for 4 hours. The tube was cooled to 55° C. and discharged directly into methanol. The precipitated polymer was extracted with hot acetone and with hot dioxane and then was allowed to stand overnight in propylene oxide to remove residual hydrogen fluoride. After drying in a vacuum oven at 160°, the polymer weighed 9.3 grams and was soluble in concentrated sulfuric acid, having an inherent viscosity of 0.84 in this solvent. Its IR spectrum was consistent with a polymer containing units of the types Example V A 300 cc. platinum-lined shaker tube was charged with 12½ grams of p-phenylbenzoyl chloride, 1.4 grams of p-phenoxybenzoyl chloride, 12 grams of anhydrous hydrogen fluoride, and 30 grams of boron trifluoride. The tube was held at −10° C. for 2 hours, at 55° for 1½ hours, and at 74° for 2½ hours. The contents of the tube were discharged directly into methanol and the percipitated polymer was ground up in this medium. The polymer was then extracted with hot acetone and hot dioxane and was allowed to stand overnight in propylene oxide to remove residual hydrogen fluoride. After drying the polymer weighed 10.6 grams, including 1.2 gram of a stiff, tough, transparent film formed during the reaction on the wall of the reaction vessel. The polymer was soluble in concentrated sulfuric acid an had an inherent viscosity of 1.16 in this solvent. An infrared spectrum was consistent with a polymer containing units of the types Example VI Diphenyl ether (9.83 grams) and 4,4'-biphenyl diacid chloride (16.11 grams) were charged into a dry stainless steel shaker tube maintained in a dry box. The tube was capped with a closure having gas inlet tubes, cooled to −80° C. and thereafter charged with hydrogen fluoride (27.8 grams) and boron trifluoride (31.0 grams). The reaction tube was warmed to −20° C. and was maintained with mechanical shaking at that temperature for two hours, then brought to room temperature (24° C.) for 4 hours.

The gases were vented and the product, a red-purple rubbery solid, was cut up in a blender under methanol. The nearly white solid which formed was collected, leached twice wtih refluxing methanol and was thereafter dried in vacuo at room temperature overnight. A theoretical yield of light orange solid was obtained; inherent viscosity of the material was 3.86 (0.5 gram in 100 milliliters of concentrated sulfuric acid).

Example VII

Diphenyl ether (111.87 grams) and 14.15 grams of terephthaloyl chloride were charged into a dry shaker tube in a dry box. The tube was closed, cooled to −80° C. and then charged with 18.9 grams of anhydrous hydrogen fluoride and 37.4 grams of boron trifluoride. The reaction tube was warmed to −20° C. and held at that temperature wtih mechanical shaking for 2 hours and then room temperature (25–26° C.) for 4 hours. The tube was opened, the gases were vented and the product, a viscous dark purple liquid was discharged into methanol contained in a blender. The light colored solid which formed was collected, leached twice in refluxing methanol and dried overnight at room temperature in vacuo. A quantitative yield of prdouct was obtained having a inherent viscosity of 0.85 (0.5 gram in 100 milliliters of concentrated sulfuric acid).

Diphenyl ether (14.72 grams) and 17.57 grams of isophthaloyl chloride were weighed into a dry shaker tube in a dry box. The tube was closed, cooled to −80° C. and then charged with 23.4 grams of anhydrous hydrogen fluoride and 34.8 grams of boron trifluoride. The reaction tube was warmed to −20° C. and was held at that temperature with mechanical shaking for 2 hours and then held to a temperature of 75° C. for 2 hours.

The gases were vented and the product, a tough dark red spongy material, was cut up in a blender under methanol. The orange red solid which formed was collected, leached twice in refluxing methanol and then dried at room temperature overnight in vacuo. The product, amounting to 96.4 percent of the theoretical yield, had an inherent viscosity of 1.11 (0.5 gram in 100 milliliters of concentrated sulfuric acid).

Example VIII

Diphenylmethane (19.11 grams) and 23.08 grams of isophthaloyl chloride were weighed into a dry shaker tube in a dry box. The tube was closed, cooled to − 80° C. and then charged with 18.5 grams of anhydrous hydrogen fluoride and 45.6 grams of boron trifluoride. The reaction tube was warmed to −20° C. and held at that temperature with shaking for 6½ hours.

The gases were vented from the tube and the brown, taffy-like product was cut up in a blender under methanol. The resulting solid, nearly white in color, was collected, leached twice in refluxing methanol and dried in vacuo at room temperature. An 88.8 percent yield of a pale yellow product was obtained with an inherent viscosity of 0.68 (0.5 gram in 100 milliliters of concentrated sulfuric acid).

Example IX

Diphenyl ether (10.32 grams) was weighed into a shaker tube after which the tube was closed, and cooled to −80° C. Thereafter 6.0 grams of phosgene, 13.2 grams of anhydrous hydrogen fluoride and 33.3 grams of boron trifluoride were charged into the tube in the order stated. The reaction tube was warmed to −20° C. and held at that temperature with mechanical shaking for 2 hours after which the temperature was raised to room temperature and held at that temperature with shaking for 4 hours. The tube was opened and the product, a light red liquid, was poured into methanol in a blender to give a fluffy light colored solid. The solid was collected, leached with hot methanol. Most of the solid dissolved, leaving a small amount of grayish residue. The residue was collected and dried in vacuo overnight at 120° C. The dried solid amounting to 0.18 gram or a 1.5 percent yield had an inherent viscosity of 0.13 (0.5 gram in 100 milliliters of concentrated sulfuric acid).

The methanol solutions were poured into water and the resulting white suspension was extracted with ether and with benzene. The resulting extracts were dried over anhydrous magnesium sulfate, filtered and then evaporated to dryness. The residue amounting to 5.59 grams had an infrared spectrum characteristic of diphenyl ether.

Example X

Diphenyl ether (11.85 grams) was weighed into a dry shaker tube in a dry box. The tube was closed, cooled to −80° C. and was then charged with 8.26 grams of phosgene (20 percent mole excess), 20.0 grams of anhydrous hydrogen fluoride and 44.8 grams of boron trifluoride. The reaction tube was warmed to −20° C. and held at that temperature with shaking for 2 hours and then brought to room temperature and held at that temperature with shaking for 2 hours and finally held at 50° C. for 2 hours.

The gases were vented and the product, a deep red liquid, was discharged into methanol in a blender. The fluffy white solid which formed was collected, leached in refluxing methanol and dried in vacuo at room temperature overnight. The dried solid, which was off-white in color, amounted to 0.15 gram (1.1 percent of theory) and had an inherent viscosity of 0.09 (0.5 gram in 100 milliliters of concentrated sulfuric acid).

Example XI

Diphenyl ether (10.17 grams), 6.10 grams of isophthaloyl chloride and 6.03 grams of terephthaloyl chloride were mixed and then charged to a cooled shaker tube. The mixture was rinsed into the tube with 20 milliliters of anhydrous methylene chloride. The tube was closed, cooled to −80° C. and then charged with 18.6 grams of hydrogen fluoride and 46.5 grams of boron trifluoride. The reaction tube was warmed to −20° C. and held at that temperature with mechanical shaking for 2 hours then brought to 50° C. and held with shaking at that temperature for 4 hours. The reaction tube was opened and the product, a deep red liquid, was poured into methanol in a blender. The resulting light-tan solid was collected, leached with refluxing methanol and dried in vacuo overnight at 50° C. The dried product, obtained in quantitative yield, had an inherent viscosity of 0.30 (0.5 gram in 100 milliliters of concentrated sulfuric acid).

Example XII

Diphenyl ether (11.61 grams) and 9.2 grams of sulfuryl chloride were weighed into a dry shaker tube in a dry box. To this there was added 50 milliliters of freshly distilled nitrobenzene after which the tube was closed, cooled to −80° C. and charged with 15.0 grams of hydrogen fluoride and 36.6 grams of boron trifluoride. The reaction tube was brought to −20° C. and held at that temperature with shaking for 2 hours and then brought and held to 50° C. for 4 hours with shaking.

The gases were vented from the tube and the product, a dark brown oil, was discharged into methanol in a blender. The brownish solid which formed was collected, leached twice with refluxing methanol and dried at room temperature in vacuo overnight. The dried brown solid amounting to 53.6 percent yield had an inherent viscosity of 0.12 (0.5 gram in 100 milliliters of concentrated sulfuric acid).

Example XIII

Into a dry shaker tube in a dry box there was introduced 12.2 grams of p-phenoxybenzene sulfonyl chloride. The tube was closed, cooled to −80° C. and charged with 10.0 grams of anhydrous hydrogen fluoride and 24.4 grams of boron trifluoride. The reaction tube was brought to −20° C. and held at that temperature with shaking for 2 hours and then brought to 50° C. and held with shaking at that temperature for 4½ hours.

The gases were vented from the tube and the product, a brown solid, was discharged into methanol in a blender. The light colored solid which formed was collected, leached twice in refluxing methanol, and dried in vacuo at room temperature overnight. The dried polymer amounting to 88.5 percent of the theoretical yield had an inherent viscosity of 0.24 (0.5 gram in 100 milliliters of concentrated sulfuric acid).

Example XIV

Dibenzofuran (16.8 grams) and 23.5 grams of isophthaloyl chloride were charged into a dry shaker tube in a dry box. The tube was closed, cooled to −80° C. and then charged with 28 grams of anhydrous hydrogen fluoride and 20.5 grams of boron trifluoride. The reaction tube was warmed to −20° C. and held at that temperature with mechanical shaking for 1 hour and then brought to room temperature (25–26° C.) and held at that temperature for 4½ hours. The tube was opened, the gases were vented and the product, a dark colored liquid, was discharged into methanol contained in a blender. The solid which formed was collected, leached twice in refluxing methanol and dried overnight at room temperature in vacuo. A 96 percent yield of product was obtained having an inherent viscosity of 0.18 (0.5 gram in 100 milliliters of concentrated sulfuric acid).

Example XV

Diphenyl (15.4 grams) and 23.5 grams of isophthaloyl chloride were weighed into a dry shaker tube in a dry box. The tube was closed, cooled to −80° C. and then charged with 30 grams of anhydrous hydrogen fluoride and 20.5 grams of boron trifluoride. The reaction tube was warmed to room temperature (25–26° C.) and held at that temperature with shaking for 1 hour and was then brought to 65° C. and held at that temperature with shaking for 4 hours. The gases were vented from the tube and the product was discharged into methanol contained in a blender. The solid material which formed was collected, leached twice in refluxing methanol and dried overnight at room temperature in vacuo. A quantitative yield of product was obtained having an inherent viscosity of 1.9 (0.5 gram in 100 milliliters of concentrated sulfuric acid).

Examples XV–XX

To prepare other representative polymers according to this invention, the procedures of the preceding examples can be followed to carry out the self-condensation of the following exemplary monomers:

| Example: | Monomers |
|---|---|
| XV | p-Nitrophenyl p-phenoxylphenyl phosphoryl chloride. |
| XVI | Alpha-naphthoyl chloride. |
| XVII | Beta-naphthoyl chloride. |
| XVIII | Beta-naphthalene sulfonyl chloride. |
| XIX | p-nitrophenyl beta-naphthalene phosphoryl chloride. |

Examples XX–XLII

To prepare other representative polymers according to this invention, the procedures of the preceding examples can be followed using equimolar amounts of the following exemplary comonomers:

| Example: | Monomers |
|---|---|
| XXI | Diphenyl ether. Naphthalene-2,6-di(carbonyl chloride) |
| XXII | Diphenyl ether. p-Nitrophenyl phosphoryl dichloride. |
| XXIII | Diphenyl ether. Naphthalene-2,6-di(sulfonyl chloride). |
| XXIV | Diphenyl. Terephthaloyl chloride. |
| XXV | Diphenyl. Benzene-1,4-di(sulfonyl chloride). |
| XXVI | Diphenyl ether. Benzene-1,4-di(sulfonyl chloride). |
| XXVII | Diphenyl sulfide. Terephthaloyl bromide. |
| XXVIII | Diphenyl sulfide. Naphthalene-2,6-di(carbonyl fluoride). |
| XXIX | Diphenyl sulfide. Isophthaloyl chloride. |
| XXX | 2,2-Diphenylpropene. Oxy-bis(4,4′-benzoyl chloride). |
| XXXI | Diphenyl dimethyl silane. Terephthaloyl chloride. |
| XXXII | 2,2-diphenyl-1,1,1,3,3,3,-hexafluoropropane. Oxy-bis(4,4′-benzoyl fluoride). |
| XXXIII | Diphenyl ether. Diphenyl-4,4′-di(carbonyl chloride). |
| XXXIV | Naphthalene. Terephthaloyl chloride. |
| XXXV | Alpha-methylnaphthalene. Isophthaloyl chloride. |
| XXXVI | Beta-methylnaphthalene. Oxy-bis(4,4′-benzene sulfonyl chloride). |
| XXXVII | Beta,beta′-dinaphthyl ether. Isophthaloyl chloride. |
| XXXVIII | Alpha,beta′-dinaphthyl ether. Phosgene. |
| XXXIX | Dibenzothiophene. Oxy-bis(4,4′-benzene sulfonyl chloride). |
| XL | Phenodioxin. Oxy-bis(4,4′-benzoyl chloride). |
| XLI | Diphenyl methane. Methylene-bis(4,4′-benzoyl chloride). |
| XLII | 2,2-Diphenyl-1,1,1,3,3,3-hexafluoropropane. p-Nitrophenyl phosphoryl difluoride. |

Examples XLIII–LXIII

To prepare other representative polymers according to this invention, the procedures of the preceding examples can be followed using the following exemplary comonomers in the indicated molar proportions:

| Example: | Comonomers |
|---|---|
| XLIII | Diphenyl (1 mole). Diphenyl ether (1 mole). Terephthaloyl chloride (1 mole). Isophthaloyl chloride (1 mole). |
| XLIV | Diphenyl (1 mole). Diphenyl ether (2 moles). Terephthaloyl chloride (1 mole). Isophthaloyl chloride (2 moles). |
| XLV | Diphenyl (2 moles). Diphenyl ether (1 mole). Terephthaloyl chloride (2 moles). Isophthaloyl chloride (1 mole). |
| XLVI | Diphenyl (1 mole). Diphenyl ether (5 moles). Terephthaloyl chloride (1 mole). Isophthaloyl chloride (5 moles). |
| XLVII | Diphenyl (1 mole). Diphenyl ether (1 mole). Phosgene (2 moles). |
| XLVIII | Diphenyl (1 mole). Diphenyl ether (3 moles). Phosgene (4 moles). |
| XLIX | Diphenyl (3 moles). Diphenyl ether (1 mole). Phosgene (4 moles). |
| L | Diphenyl (1 mole). Diphenyl ether (1 mole). Sulfuryl chloride (2 moles). |
| LI | Diphenyl (1 mole). Diphenyl ether (8 moles). Sulfuryl chloride (9 moles). |
| LII | Diphenyl (1 mole). Diphenyl ether (1 mole). Diphenyl sulfide (1 mole). Isophthaloyl chloride (3 moles). |
| LIII | Diphenyl (1 mole). Diphenyl ether (4 moles). Diphenyl sulfide (1 mole). Isophthaloyl chloride (6 moles). |
| LIV | Diphenyl ether (3 moles). Terephthaloyl chloride (1 mole). Isophthaloyl chloride (1 mole). 2,6-Naphthoyl dichloride (1 mole). |
| LV | Diphenylene (2 moles). Terephthaloyl chloride (1 mole). Isophthaloyl chloride (1 mole). |
| LVI | p-Phenoxybenzoyl chloride (1 mole). p-Phenylbenzoyl chloride (1 mole). o-Phenylbenzoyl chloride (1 mole). |

| Example: | Comonomers |
|---|---|
| LVII | p-Phenoxybenzoyl chloride (2 moles).<br>p-Phenylbenzoyl chloride (1 mole).<br>o-Phenylbenzoyl chloride (2 moles). |
| LVIII | p-Phenoxybenzoyl chloride (1 mole).<br>p-Phenylbenzoyl chloride (2 moles).<br>o-Phenylbenzoyl chloride (3 moles). |
| LIX | p-Phenoxybenzoyl chloride (1 mole).<br>o-Phenoxybenzoyl chloride (1 mole).<br>p-Phenoxybenzene sulfonyl chloride (1 mole).<br>p-Phenylbenzene sulfonyl chloride (1 mole). |
| LX | p-Phenoxybenzoyl chloride (4 moles).<br>o-Phenoxybenzoyl chloride (2 moles).<br>p-Phenoxybenzene sulfonyl chloride (1 mole).<br>p-Phenylbenzene sulfonyl chloride (2 moles). |
| LXI | Diphenyl ether (3 moles).<br>Terephthaloyl chloride (1 mole).<br>Isophthaloyl chloride (1 mole).<br>2,6-Naphthoyl dichloride (1 mole).<br>p-Phenoxybenzoyl chloride (2 moles). |
| LXII | Diphenyl ether (1 mole).<br>p-Phenoxybenzoyl chloride (1 mole).<br>o-Nitrophenyl phosphoryl dichloride (1 mole). |
| LXIII | Diphenyl ether (2 moles).<br>p-Phenoxybenzoyl chloride (1 mole).<br>o-Nitrophenyl phosphoryl dichloride (2 moles). |

The foregoing detailed description has been given for clearness of understanding only and no unnecessary limitations are to be understood therefrom. The invention is not limited to the exact details shown and described, for obvious modifications will occur to those skilled in the art.

I claim:
1. A process of preparing a film and fiber forming polymer consisting essentially of at least one of the recurring units selected from the group consisting of

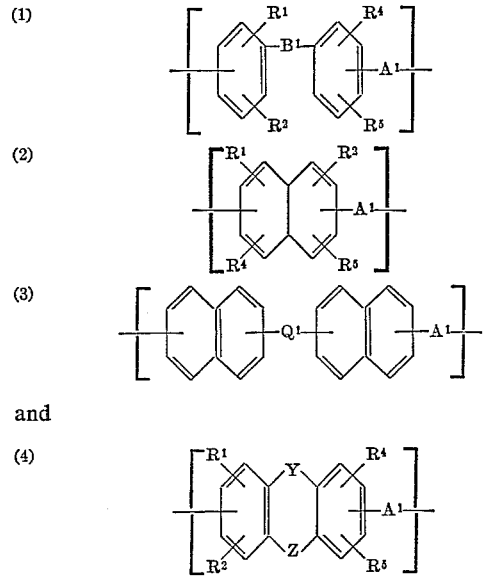

where $A^1$ is selected from the group consisting of

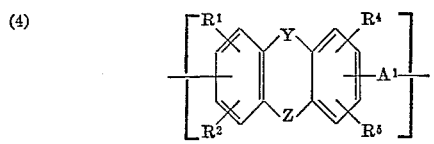

and A where A is a radical selected from the group consisting of

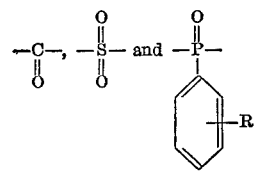

where R is selected from the group consisting of hydrogen, nitro, nitroso, cyano, fluoro and trifluoromethyl; $R^1$, $R^2$, $R^4$ and $R^5$ are each selected from the group consisting of hydrogen, alkyl of 1 through 4 carbons, alkoxy of 1 through 4 carbons, halogen, hydroxy, phenyl substituted with at least 1 and less than 3 electronegative radicals, and phenoxy substituted with at least 1 and less than 3 electronegative radicals, said electronegative radicals being selected from the group consisting of nitro, nitroso, cyano, fluoro and trifluoromethyl; $B^1$ is selected from the group consisting of a covalent bond, —O—, —S—,

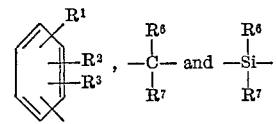

where $R^1$ and $R^2$ have the same meaning as above and $R^3$ is selected from the group consisting of nitro, nitroso, cyano, fluoro and trifluoromethyl; where $R^6$ and $R^7$ each is selected from the group consisting of hydrogen, alkyl of 1 through 4 carbons, trifluoromethyl and

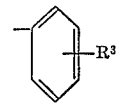

where $R^3$ has the same meaning as above; $Q^1$ is selected from the group consisting of a covalent bond; —O—; and —S—; and Y and Z each is selected from the group consisting of a covalent bond; —O—; —S—; and —CH$_2$—; said process comprising reacting at least one monomeric reactant selected from the group consisting of those having the formulas:

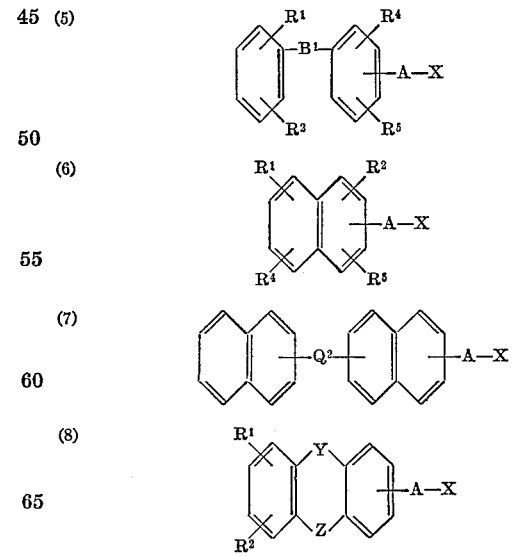

(11) 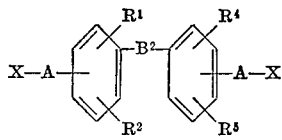

(12) 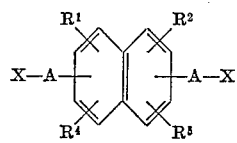

(13) 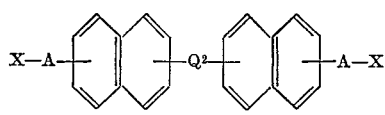

and

(14) 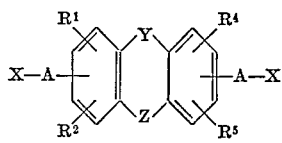

where X is halogen; $Q^2$ is selected from the group consisting of a covalent bond, —O—, —S—, and A; $B^2$ is selected from the group consisting of $B^1$ and A; and each of the other letters has the same meaning as above; and for each said monomeric reactant of Formulas 9 through 14 an equimolar amount of a monomeric reactant selected from the group consisting of those having the formulas

(15) 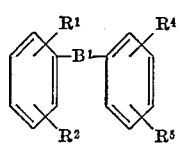

(16) 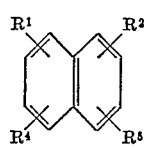

(17) 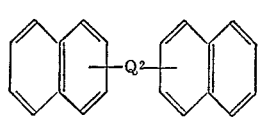

and

(18) 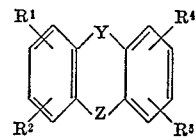

where each of the letters has the same meaning as above; said reacting being carried out in the presence of at least a molar equivalent of boron trifluoride per A radical in the monomeric reactants, and in excess of a molar equivalent of hydrogen fluoride based on the amount of boron trifluoride, at a temperature and for a time sufficient to produce said polymer.

2. The process as in claim 1 carried out using from about 2 to about 20 moles of boron trifluoride per A radical in the monomeric reactants and from about 2 to about 10 moles of hydrogen fluoride per mole of boron trifluoride.

3. The process as in claim 1 carried out at a temperature in the range from —80° to 150° C.

4. The process of claim 3 wherein the polymer has an inherent viscosity of at least 0.5 as measured from a 0.5 percent by weight solution in 98 percent aqueous sulfuric acid at 30° C.

5. The process of claim 4 wherein at least 80 percent of the resulting polymer is formed of units of the formula

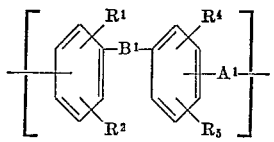

6. The process of claim 5 wherein at least 80 percent of the resulting polymer is formed of units of the formula

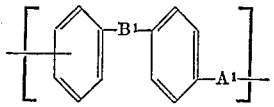

7. The process of claim 6 wherein —$B^1$— is —O—.

8. The process of claim 7 wherein —$A^1$— is $$-\overset{\text{O}}{\underset{}{\text{C}}}-$$

9. The process of claim 7 wherein —$A^1$— is

10. The process of preparing a film and fiber forming polymer consisting essentially of the recurring unit (a) 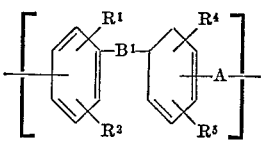

where —A— is a radical selected from the group consisting of

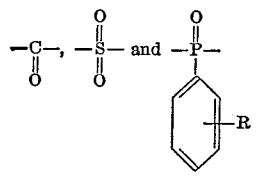

where R is selected from the group consisting of hydrogen, nitro, nitroso, cyano, fluoro and trifluoromethyl; $R^1$, $R^2$, $R^4$ and $R^5$ are each selected from the group consisting of hydrogen, alkyl of 1 through 4 carbons, alkoxy of 1 through 4 carbons, halogen, hydroxy, phenyl substituted with at least 1 and less than 3 electronegative radicals, and phenoxy substituted with at least 1 and less than 3 electronegative radicals, said electronegative radicals being selected from the group consisting of nitro, nitroso, cyano, fluoro and trifluoromethyl; —$B^1$— is selected from the group consisting of a covalent bond, —O—, —S—,

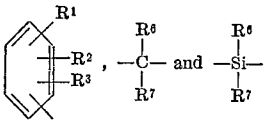

where $R^1$ and $R^2$ have the same meaning as above and $R^3$ is selected from the group consisting of nitro, nitroso, cyano, fluoro and trifluoromethyl; where $R^6$ and $R^7$ each is selected from the group consisting of hydrogen, alkyl of 1 through 4 carbons, trifluoromethyl and

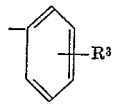

where $R^3$ has the same meaning as above; said process comprising reacting at least one monomeric reactant selected from the group consisting of those having the formulas (b)

$$\text{R}^1 \quad \text{R}^4$$
$$\phantom{xx}\text{-B}^1\text{-}\phantom{xx}\text{-A-X}$$
$$\text{R}^2 \quad \text{R}^5$$

(c)      X—A—X (d)

$$\text{R}^1 \quad \text{R}^4$$
$$\text{X-A-}\phantom{x}\text{-B}^2\text{-}\phantom{x}\text{-A-X}$$
$$\text{R}^2 \quad \text{R}^5$$

where X is halogen; $B^2$ is selected from the group consisting of $B^1$ and A; and each of the other letters has the same meaning as above; and for each said monomeric reactant of Formulas c and d an equimolar amount of a monomeric reactant selected from the group consisting of those having the formulas (e)

$$\text{R}^1 \quad \text{R}^4$$
$$\phantom{xx}\text{-B}^2\text{-}\phantom{xx}$$
$$\text{R}^2 \quad \text{R}^5$$

where each of the letters has the same meaning as above; said reacting being carried out in the presence of at least a molar equivalent of boron trifluoride per A radical in the monomeric reactants, and in excess of a molar equivalent of hydrogen fluoride based on the amount of boron trifluoride, at a temperature and for a time sufficient to produce said polymer.

11. The process as in claim 10 carried out using from about 2 to 20 moles of boron trifluoride per A radical in the monomeric reactants and from about 2 to about 10 moles of hydrogen fluoride per mole of boron trifluoride.

12. The process as in claim 11 carried out at a temperature in the range from —80° to 150° C.

13. The process of claim 12 wherein the polymer has an inherent viscosity of at least 0.5 as measured from a 0.5 percent by weight solution in 98 percent aqueous sulfuric acid at 30° C.

14. The process of claim 13 wherein at least 80 percent of the resulting polymer is formed of units wherein $R^1$, $R^2$, $R^4$ and $R^5$ are hydrogen.

15. The process of claim 14 wherein —$B^1$— is —O—.

16. The process of claim 15 wherein —A— is $$-\underset{\underset{O}{\|}}{C}-$$

17. The process of claim 15 wherein —A— is $$-\underset{\underset{O}{\|}}{\overset{\overset{O}{\|}}{S}}-$$

18. The process of claim 17 wherein the resulting polymer consists essentially of units of the formula $$\left[\phantom{x}\text{-O-}\phantom{x}\underset{\underset{O}{\|}}{\overset{\overset{O}{\|}}{S}}\text{-}\right]$$

and wherein X is chloride.

References Cited

UNITED STATES PATENTS 3,321,449    5/1967    Vogel             260—79.3

FOREIGN PATENTS 971,227    9/1964    Great Britain.
1,383,048    10/1964    France.

OTHER REFERENCES

Olah, Friedel-Crafts and Related Reactions, New York, Interscience 1964, vol. III, (pages 2, 3 and 1324).

Olah, Friedel-Crafts and Related Reactions, New York, Interscience, vol. I, 1963, pages 283–290 and 326; vol. III, 1964, pages 13–16.

WILLIAM H. SHORT, *Primary Examiner.*

M. GOLDSTEIN, *Assistant Examiner.*

U.S. Cl. X.R.

260—2, 47, 61, 78, 78.4, 79.3; 264—288, 289